(12) United States Patent
Schlegel et al.

(10) Patent No.: US 8,493,953 B1
(45) Date of Patent: Jul. 23, 2013

(54) METHOD AND DEVICE FOR MITIGATION OF MULTI-USER INTERFERENCE IN CODE DIVISION MULTIPLE ACCESS

(75) Inventors: Christian Schlegel, Park City, UT (US); Thomas R. Giallorenzi, Herriman, UT (US); Zachary Bagley, Salt Lake City, UT (US)

(73) Assignee: L-3 Communications, New York, NY (US)

( * ) Notice: Subject to any disclaimer, the term of this patent is extended or adjusted under 35 U.S.C. 154(b) by 1831 days.

(21) Appl. No.: 11/354,355

(22) Filed: Feb. 14, 2006

(51) Int. Cl.
*H04B 7/216* (2006.01)
*H04B 1/10* (2006.01)
*H04J 13/00* (2011.01)

(52) U.S. Cl.
USPC ........... 370/342; 370/464; 455/63.1; 455/273

(58) Field of Classification Search
USPC ........................ 370/342; 455/63.1, 296, 278.1
See application file for complete search history.

(56) References Cited

U.S. PATENT DOCUMENTS

| | | | |
|---|---|---|---|
| 5,235,612 A | 8/1993 | Stilwell et al. | |
| 5,579,304 A | 11/1996 | Sugimoto et al. | |
| 5,757,791 A | 5/1998 | Kanterakis et al. | |
| 6,259,688 B1 | 7/2001 | Schilling et al. | |
| 6,496,534 B1 * | 12/2002 | Shimizu et al. | 370/335 |
| 6,574,270 B1 | 6/2003 | Madkour et al. | |
| 6,816,541 B1 | 11/2004 | Schmidl | |
| 2002/0051433 A1* | 5/2002 | Affes et al. | 370/335 |
| 2002/0072336 A1* | 6/2002 | Mottier | 455/101 |
| 2002/0154717 A1* | 10/2002 | Shima et al. | 375/349 |
| 2003/0036359 A1* | 2/2003 | Dent et al. | 455/63 |
| 2003/0099225 A1* | 5/2003 | Oates | 370/342 |
| 2004/0017843 A1 | 1/2004 | Fitton et al. | |
| 2006/0193374 A1* | 8/2006 | Guo et al. | 375/148 |

OTHER PUBLICATIONS

Grant, Alex "convergence of linear interference cancellation multiuser receivers" IEEE, Oct. 2001, pp. 1824-1834, vol. 49, No. 10.
Divsalar, Dariush "improved parallel interference cancellation for CDMA" IEE, Feb. 1998, pp. 258-268, vol. 45, No. 2.

* cited by examiner

*Primary Examiner* — Anthony Addy
*Assistant Examiner* — Tangela T. Chambers
(74) *Attorney, Agent, or Firm* — Kirton McConkie

(57) ABSTRACT

A method and apparatus for mitigating multi-user interference in reception of a code division multiple access (CDMA) signal is described. The CDMA signal has a plurality of spread user symbol streams, each spread by a corresponding one of a plurality of spreading codes. Estimated symbols are iteratively improved by forming a reconstructed signal from the estimated symbols, subtracting the reconstructed signal from the CDMA signal to create a difference signal, and adjusting the estimated symbols based on a combination of the difference signal and the estimated symbols.

12 Claims, 4 Drawing Sheets

METHOD AND DEVICE FOR MITIGATION OF MULTI-USER INTERFERENCE IN CODE DIVISION MULTIPLE ACCESS

FIELD OF THE INVENTION

The present invention relates generally to receivers for spread spectrum communications, and more particularly to mitigation of multi-user interference in a spread spectrum receiver.

BACKGROUND

Code division multiple access (CDMA) techniques have proven useful in a variety of communications applications, including cellular telephones, wireless local area networks, and military communications. CDMA allows a number of users to share a spectral band (e.g. a radio channel). User data is combined with a corresponding spreading code to create a CDMA user signal. The spreading code is usually a pseudo-random sequence of symbols that can be generated by a transmitter, and also generated by a receiver which knows the characteristics of the code. Generally, different users are assigned different spreading codes. Each symbol of the pseudorandom sequence is referred to as a chip. The time duration of a chip is referred to as a chip time, and hence the chip rate (or spreading code frequency) is the reciprocal of the chip time. The chip rate is typically at least an order of magnitude higher than the data rate of the underlying information to be transmitted, although lower ratios are sometimes used.

Multiple CDMA user signals can be transmitted in the same spectral band, for example by summing and transmitting multiple users into a radio channel (e.g. in a cellular base station transmitter), or by multiple CDMA transmitters each transmitting separately into the same radio channel (e.g. multiple cellular handset transmitters tuned to the same radio channel).

The spreading codes are used by receivers to decode particular users. A receiver decoding a particular user will, to a greater or lesser extent depending on the particular codes used, reject the signals from other users. Ideally, the CDMA codes are assigned so that a receiver decoding one user will completely reject other users. Spreading codes providing these properties are known and referred to as orthogonal codes. In practice, non-idealities in the transmitter, receiver, and communication channel (including e.g., multipath, filtering, distortion, and synchronization errors) result in some interference occurring between users even when orthogonal codes are used. Additional interference can also result from the use of non-orthogonal codes. The resulting interference between users is called multi-user interference, and can be further exacerbated when users' signal levels at the receiver are different from each other.

Theoretically optimum performance can be obtained when multi-user interference is present by performing joint detection of all users. Such approaches, however, are computationally complex and assume knowledge of the statistics of the multi-user interference which may be unavailable. Hence, alternate approaches with less computational complexity have been sought.

One sub-optimal approach is known as interference cancellation. Interference cancellation typically proceeds by making initial estimates of the user's data (e.g. using a matched filter receiver). An estimate of the multi-user interference is then obtained by re-spreading these initial data estimates, and for each user, subtracting every other user's re-spread signal. Interference cancellation approaches, although successful, often fail to provide significant performance gains. Interference cancellation is also computationally complex, since much of the processing is performed at the chip rate. Interference cancellation also proves difficult when different user's data timing are not aligned to each other in so-called asynchronous CDMA.

SUMMARY OF THE INVENTION

It has been recognized that it would be advantageous to develop a technique for mitigating multi-user interference in reception of a code division multiple access (CDMA) signal.

One embodiment of the present invention is a method for mitigating multi-user interference in reception of a CDMA signal. The CDMA signal has a plurality of spread user symbol streams, each spread by a corresponding one of a plurality of spreading codes. Each spreading code has a corresponding despreading code. A reconstructed signal is subtracted from the CDMA signal to form a difference signal. The difference signal is despread using a plurality of despreading codes to obtain a plurality of despread streams. Each of the plurality of despread streams is combined with a corresponding one of the plurality of estimated symbol streams to produce a plurality of modified symbol streams. The plurality of estimated symbol streams is adjusted based on the plurality of modified symbol streams. The reconstructed signal is formed by re-spreading the plurality of estimated symbol streams.

Other embodiments of the present invention include apparatuses and additional methods for mitigating multi-user interference in reception of CDMA signals.

Additional features and advantages of the invention will be apparent from the detailed description which follows, taken in conjunction with the accompanying drawings, which together illustrate, by way of example, features of the invention.

DETAILED DESCRIPTION

Figure 1:
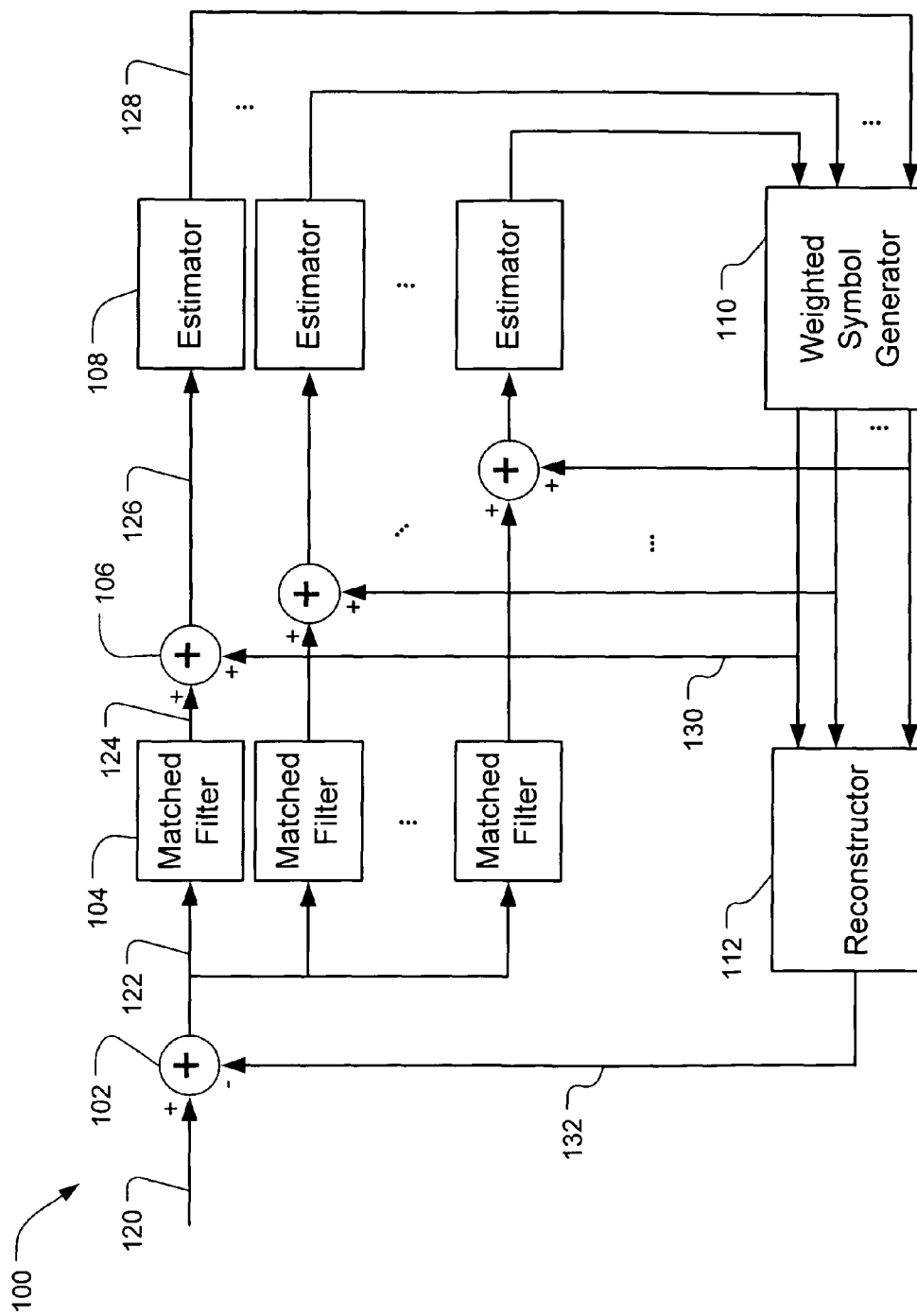
FIG. 1 is a block diagram of an apparatus for mitigating multi-user interference in CDMA reception in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In general, a CDMA signal can be generated by a single transmitter, or a plurality of transmitters. For example, in a cellular system, a CDMA signal is generated by a base station which contains the data for multiple users. The base station spreads the data symbol streams for each user and combines the spread signals to form the CDMA signal which is transmitted into the radio channel. Each mobile handset in the cellular system thus receives a CDMA signal having the plurality of spread user symbol streams generated by the base station, from which it can demodulate one or more users. In contrast, the CDMA signal received by the base station is generated by a plurality of mobile handsets, each mobile handset spreading one or more data symbol streams and transmitting the spread symbol stream into the radio channel. One difference between these two situations is that, in the handset to base station link, the symbol timing of the user symbols transmitted by handsets is generally asynchronous with respect to each other, whereas in the base station to handset link the symbol timing of the user symbols transmitted by the base station are usually synchronous. In either situation, multi-user interference may result, and the presently disclosed inventive techniques can be applied.

Multi-user interference in the CDMA signal can be generated at various points in the transmission and process. For example, many CDMA systems use codes which are not perfectly orthogonal, and thus are not even theoretically capable of providing operation free from multi-user interference. With non-orthogonal codes, after matched filtering in a receiver, even when the receiver matched filtering is perfectly matched to the transmitter, crosstalk between different user symbol streams will occur at the output of the matched filter. Even with orthogonal codes, crosstalk can occur if the receiver matched filtering is not perfectly matched to the transmitter, for example due to filtering in the transmitter, receiver, multi-path in the communication channel, and multipath propagation in the communication channel. Because the spread user symbol streams in a CDMA signal occupy a common bandwidth, it is difficult to measure multi-user interference present in the CDMA signal directly, and thus-multi-user interference is often measured at the output of the receiver matched filtering. One way to characterize the multi-user interference is by considering the cross-correlation of the spreading codes.

Accordingly, principles of operation of the presently disclosed inventive techniques can be understood by reference to a mathematical model. A received CDMA signal having a plurality of spread user symbol streams can be represented by $$y = SWx + n \qquad (1)$$

where S is a spreading matrix, W is a diagonal weight matrix, x is the user data symbol vector, and n is a noise vector. Bold upper case symbols are used to denote matrices, bold lower case symbols are used to denote vectors, and italics are used to denote scalar quantities, throughout this disclosure. The user data symbol vector x is a column vector of data symbols corresponding to each user. The data symbols can be, for example, binary data, or can be chosen from a higher order alphabet (e.g. quadrature or M-ary symbols). The weight matrix W is a diagonal matrix of individual gains for each user. These gains can, for example, correspond to channel gains or transmitter power for each user. Each column of the spreading matrix S thus contains the spreading code for one user. For purpose of the mathematical derivation, the noise is assumed to be white with variance a', although this assumption is not essential to operation of the technique.

After processing the signal by a bank of despreaders, the despread signal is given by $$y_{MF} = S^*(SWx + n) \qquad (2)$$

where the superscript * represents the complex conjugate. This can be rearranged as $$y_{MF} = RWx + n' \qquad (3)$$

where R is the cross correlation matrix of the spreading codes (R=S*S). In an orthogonal system, R is a diagonal matrix, thus representing the situation where there is essentially no multi-user interference. More generally, the spreading matrix S can include the effects of transmit (and receive) pulse shaping and other non-idealities, in which case R is non-diagonal as it includes the cross-correlation between users, and thus describes the statistics of the multi-user interference. Although many prior art techniques assume a knowledge of R, as will be seen, knowledge of R is not essential to the practice of the technique.

It is known that an estimate of the user data can be obtained using a minimum mean square error (MMSE) filter to derive an estimate of the data, $\hat{x}$ by:

$$\hat{x} = (WRW + \sigma^2 I)^{-1} W y_{MF} \qquad (4)$$

where I is the identity matrix (see A. Grant & C. Schlegel, *Convergence of Linear Interference Cancellation: Multiuser Receivers,* 49 IEEE TRANS. ON COMMUNICATION, 1824, 1825, incorporated herein by reference in its entirety).

As described above, the MMSE filter requires a matrix inversion which typically requires a number of operations of the order $N^3$, where N is the number of users. This can, however, be simplified using iteration. In general, the linear system $$x = F^{-1} y' \qquad (5)$$

can be solved for x by the iteration $$\hat{x}^{(i+1)} = D^{-1} y' - D^{-1} F \hat{x}^{(i)} + \hat{x}^{(i)} \qquad (6)$$

where D=diag(F) (see Grant & Schlegel, supra). The parenthetical superscripts refer to the iteration, i.

This result can be applied to the MMSE filter by taking $y' = W y_{MF}$ and $F = WRW + \sigma^2 I$, to yield the iterative solution $$\hat{x}^{(i+1)} = D^{-1} W y_{MF} - D^{-1} (WRW + \sigma^2 I) \hat{x}^{(i)} + \hat{x}^{(i)}. \qquad (7)$$

The terms can be rearranged to place all of the terms involving the spreading matrices together, to obtain $$\hat{x}^{(i+1)} = D^{-1} W y_{MF} - D^{-1} WRW \hat{x}^{(i)} - D^{-1} \sigma^2 I \hat{x}^{(i)} + \hat{x}^{(i)}$$

$$\hat{x}^{(i+1)} = D^{-1} W(y_{MF} - RW \hat{x}^{(i)}) - D^{-1} (\sigma^2 I - D) \hat{x}^{(i)}$$

$$\hat{x}^{(i+1)} = D^{-1} WS^*(y - SW \hat{x}^{(i)}) - D^{-1} (\sigma^2 I - D) \hat{x}^{(i)}$$

$$\hat{x}^{(i+1)} = D^{-1} [WS^*(y - SW \hat{x}^{(i)}) - (\sigma^2 I - D) \hat{x}^{(i)}]. \qquad (8)$$

This can be further simplified by noting that D=diag(F)=diag(WRW+$\sigma^2$I) which can be simplified to D=$W^2 + \sigma^2 I$ since the diagonal elements of R are 1 and W is diagonal. Hence the iteration is given by $$\hat{x}^{(i+1)} = (W^2 + \sigma^2 I)^{-1} [WS^*(y - SW \hat{x}^{(i)}) + W^2 \hat{x}^{(i)}] \qquad (9)$$

or, by pulling the W factor out $$\hat{x}^{(i+1)} = (W^2 + \sigma^2 I)^{-1} W [S^*(y - SW \hat{x}^{(i)}) + W \hat{x}^{(i)}]. \qquad (10)$$

Note that the matrix inversion is trivial, since both W and I are diagonal. Hence, the inverse is a diagonal matrix with the reciprocal of each individual element. Moreover, the scaling factor $(W^2 + \sigma^2 I)^{-1} W$ for each user k is therefore given by $$\frac{w_k}{w_k^2 + \sigma^2}.$$

The iterative process will now be described intuitively with reference to equation (10). First an initial estimate $\hat{x}^{(0)}$ of the user data x is obtained. A new estimate of the data can thus be found from the initial estimate. The new estimate is found by combining the previous estimate with an error term, wher0065 the error term is obtained by subtracting a reconstructed signal $SW\hat{x}^{(i)}$ (based on the previous estimated symbols) from the received CDMA signal. New estimates can be obtained iteratively, obtaining an $(i+1)^{th}$ estimate of the data from the previous $i^{th}$ estimate.

Unlike interference cancellers, the reconstructed signal will cancel each of the correctly estimated users. In other words, $y-SW\hat{x}^{(i)}$ will contain only noise if each of the users is correctly estimated. In practice, as the estimated symbols converge towards correct values, $y-SW\hat{x}^{(i)}$ will contain predominantly noise. Note that the processing described by equation (1) is greatly simplified as compared to interference cancellers, since separate summations are not performed for each user. The difference signal thus contains information as to how accurate (or inaccurate) the previously estimated data is. This is combined with the previous data estimates to produce the new data estimate.

Accordingly, in accordance with an embodiment of the present invention, an apparatus for mitigating multi-user interference in reception of a CDMA signal is shown in FIG. 1. The apparatus, shown generally at 100, includes a first adder 102, a plurality of matched filters 104, a plurality of second adders 106, a plurality of estimators 108, a weighted symbol generator 110, and a reconstructor 112. A CDMA signal 120 (e.g. y) is accepted by the first adder, and a reconstructed signal 132 (e.g. $SW\hat{x}$) is subtracted to form a difference signal 122 (e.g. $y-SW\hat{x}$). The difference signal is provided to the plurality of matched filters, each of which outputs a plurality of matched filter outputs 124 (e.g. $S^*(y-SW\hat{x})$). The plurality of matched filter outputs are accepted by the plurality of second adders and each matched filter output is summed with a corresponding one of a plurality of weighted symbol estimates 130 (e.g. $W\hat{x}$) to produce a plurality of adjusted matched filter outputs 126 (e.g. $S^*(y-SW\hat{x})+W\hat{x}$).

The plurality of estimators 108 are configured to estimate a plurality of estimated symbols 128 (e.g. $\hat{x}$) from the adjusted matched filter outputs. The weighted symbol generator 110 generates the plurality of weighted symbol estimates 130 from the plurality of estimated symbols, and the reconstructor 112 generates the reconstructed signal 132 from the plurality of weighted symbol estimates by re-spreading the plurality of weighted symbol estimates using the plurality of spreading codes (e.g. S).

Operationally, the apparatus can be used to iteratively improve a set of estimated symbols 128. In a first operation, the reconstructed signal 132 can be set to zero, and the first set of estimated symbols determined from the CDMA signal 120 as shown. Then, each iteration corresponds to the estimator producing a new set of estimated symbols (e.g. $\hat{x}^{(i+1)}$) from the previous set (e.g. $\hat{x}^{(i)}$). For example, in a digital implementation, the estimator can include a register which is clocked to create a new set of estimated symbols each clock time. Of course, as will occur to one of skill in the art, additional registers and pipelining can be included in the apparatus without affecting the principle of operation.

One significant benefit of the apparatus 100 is significant simplification over prior art interference cancellers. Interference cancellers perform a chip-rate subtraction for each user, where re-spread data symbols are subtracted for every other user other than the desired user. That is, for each of the K users, a subtraction of the K−1 other users is performed. Hence, K different combinations of re-spread data symbols are generated and subtracted from the CDMA signal. In contrast, the apparatus 100 uses a single chip rate adder 102. Hence, a significant reduction in components can be achieved over interference cancellers.

An additional benefit of the apparatus 100 is improved compatibility with asynchronous CDMA, where the spread user symbol streams are asynchronous with respect to each other. In part, this improved compatibility is obtained because a single reconstructed signal 132 is produced, rather than multiple reconstructed signals as in an interference canceller. Differences in the symbol timing of the user symbol streams can be handled in the second group 242. For example, rather than updating each component of the user data estimate X simultaneously, each individual user data estimate can be updated independently of each other.

As just described, the apparatus 100 can provide an efficient implementation of an MMSE receiver. The apparatus can also be used to provide an efficient implementation of a decorrelator receiver as well. A decorrelator receiver is described by $$\hat{x} = W^{-1}R^{-1}y_{MF} \qquad (11)$$

for which a similar solution for an iterative implementation can be obtained from (6) by taking $y' = y_{MF}$, $F = WR$, and $D = \text{diag}(F) = \text{diag}(WR) = W$. The resulting iteration is given by $$\hat{x}^{(i)} = W^{-1}[S^*(y - SW\hat{x}^{(i-1)}) + W\hat{x}^{(i-1)}] \qquad (12)$$

where this result is obtained using similar mathematical techniques as used above. Note that this is the same result obtained from the MMSE case equation (10) by setting $\sigma^2$ to zero. The apparatus can thus provide either a MMSE or decorrelating receiver by including the appropriate scaling factor as described further below.

Figure 2:
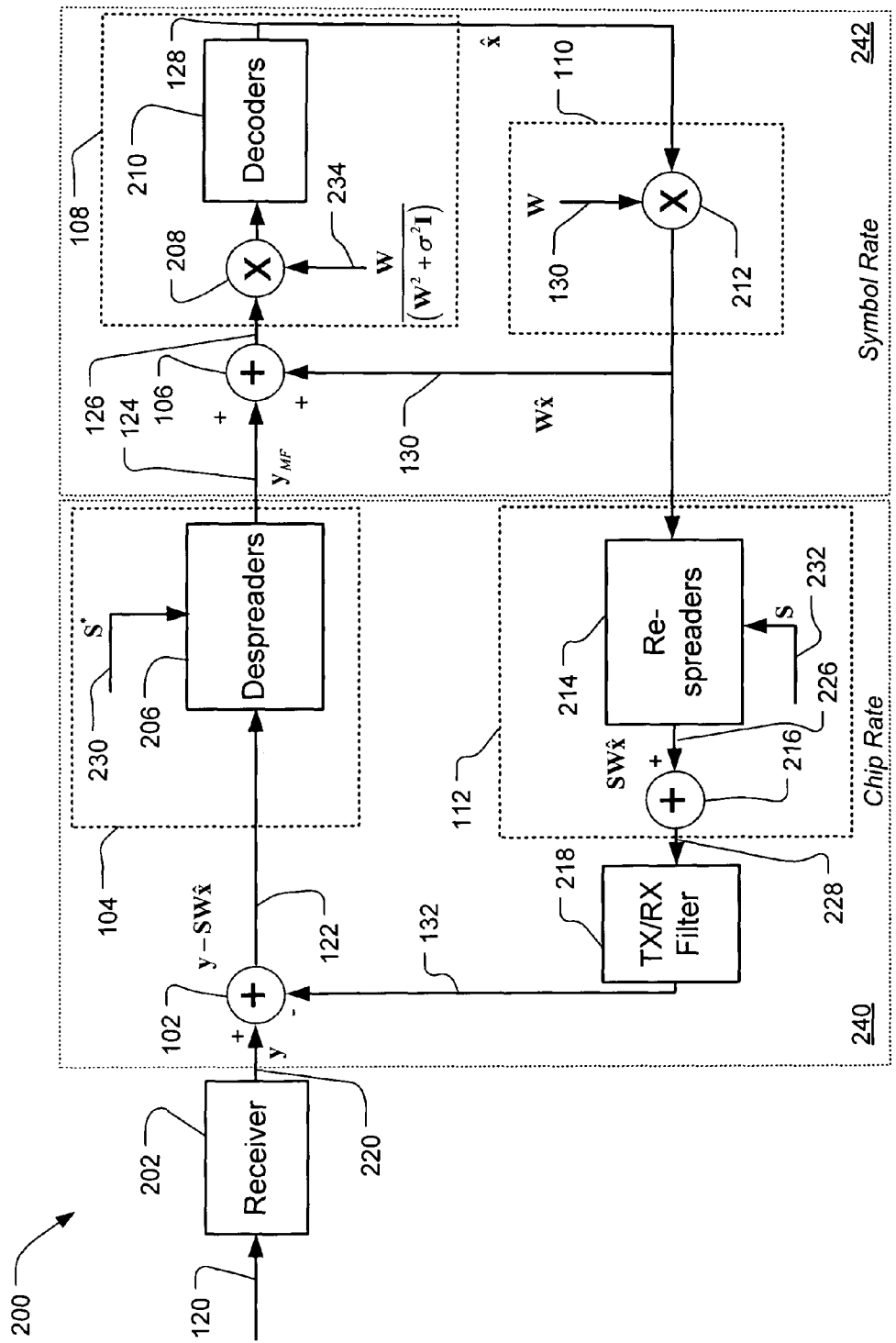
FIG. 2 is a block diagram of another apparatus for mitigating multi-user interference in CDMA reception in accordance with an embodiment of the present invention.

Various detailed implementation of the components of the apparatus 100 can be used as will now be described in further detail with reference to another embodiment of the present invention as illustrated in FIG. 2. An apparatus for mitigating multi-user interference in reception of a CDMA signal is shown generally at 200. The apparatus can include a receiver 202 configured to accept the CDMA signal 120 at a radio frequency and convert the CDMA signal to received CDMA signal 220 at an intermediate frequency. The intermediate frequency can be frequency higher or lower than the radio frequency of the CDMA signal. For example, the intermediate frequency can be a standard intermediate frequency (e.g. 455 kHz, 10.7 MHz, 70 MHz, 140 MHz, etc.) or a baseband (zero) frequency. The receiver can also include an antenna to receive a radio frequency signal. As another example, the receiver can be provided by a cellular base station receiver front end. Various other embodiments of the receiver will be appropriate depending on the application, which will occur to one of skill in the art in possession of this disclosure.

The apparatus 200 includes a first group of components 240, which operates at substantially the chip rate of the CDMA signal. For example, the first group can operate at the chip rate or a multiple of the chip rate (e.g. two samples per chip). Of course, the first group need not operate exactly at the chip rate, for example, due to small chip rate errors between the CDMA signal received and the expected chip rate. Various techniques for accommodating such small chip rate errors are known and can be applied herein as will occur to one of skill in the art having possession of this disclosure. The first group of components includes the first adder 102, the plurality of matched filters 104, the reconstructor 112, and optional transmit/receive (TX/RX) filter 218.

The apparatus also includes a second group of components 242, which operate at substantially the symbol rate of the CDMA signal. For example, the second group can operate at the symbol rate or a multiple of the symbol rate (e.g. two samples per symbol). Of course, the second group need not operate exactly at the symbol rate, for example due to small symbol rate errors between the CDMA signal received and the expected symbol rate. Such symbol rate errors are usually tied to the chip rate, and can be accommodated as mentioned above. The second group of components includes the plurality of second adders 106, the plurality of estimators 108, and the weighted symbol generator 110.

By operating the second group of components 242 at substantially the symbol rate, an additional benefit of the apparatus 200 is that many of the components operate at the much lower symbol rate, rather than the chip rate. In particular, the matched filter outputs 124 can be sampled at the symbol rate (or a small multiple thereof), and thus the second adders 106, estimators 108, and weighted symbol generator 110 can also operate at the lower rate. By operating at a lower symbol rate, less power is consumed, or alternately, lower processing speed is used to implement a receiver.

The apparatus 200 operates according to the principles as described above. The reconstructed signal 132 is subtracted from the received CDMA signal 220 to form a difference signal 122 by the first adder 102. The adder can be implemented using a differential amplifier, passive combiner, adder, subtractor, or similar analog or digital equivalents. Upon the first iteration of the apparatus 200, when no initial estimated data is present, the reconstructed signal 132 can be set to zero, and the difference signal thus corresponds to the received CDMA signal.

Once an initial set of estimated symbols 128 is obtained, the difference signal is thus a measure of error between the received signal and the reconstructed signal. The difference signal can thus be viewed as containing extrinsic information regarding the user symbols. If the estimated symbols match the user symbols precisely, the resulting difference signal is zero in the absence of noise. In practice, the difference signal will thus be a mixture of noise and mismatch errors. Various sources of mismatch error will occur to one of skill in the art, including, for example, mismatches between the spreading and despreading codes, and between the signal processing used to produce the CDMA signal and the signal processing used in the apparatus.

The matched filters 104 can be implemented by despreaders 206. For example, each despreader can be configured to perform correlation of the difference signal 122 with one of the despreading codes 230. For example, for each user k, with spreading code $s_k$, the corresponding despreading code is denoted by $s_k^*$. For some spreading codes, e.g. binary PN codes, the conjugate can be ignored, since $s_k s_k = 1$. Various other spreading-despreading code combinations will occur to one of skill in the art. The despreaders can be implemented using a surface acoustic wave device, analog filter, finite impulse response filter, multiplier-accumulator, correlator, or similar analog or digital equivalents. The matched filter outputs 124 can thus be viewed as extrinsic information separated into individual symbol components. The matched filter outputs (analogous to extrinsic information) are then combined with the weighted estimated symbols 130 (analogous to intrinsic information) to provide adjusted matched filter outputs which are provided to the estimators.

The estimators 108 can be implemented using decoders 210, for example a forward error correction decoder, to provide the estimated data 128. Either soft or hard decision decoding can be performed, although soft decision decoding is presently preferred. For example, a soft-input soft-output decoder can be used advantageously. Various forward error correction decoders are known in the art including block decoders, convolutional decoders, and turbo decoders. Alternately, each decoder can perform a hyperbolic tangent operation to provide an estimate of each data symbol. Each estimator can also include a scaling circuit, to scale the adjusted matched filter outputs 126 by a scaling factor 234 before decoding, for example a first multiplier 208. As noted above, the scaling factor can be set to either $w_k/(w_k^2+\sigma^2)$ for MMSE, as shown in FIG. 2 or $1/w_k$ for decorrelation (not shown), where k is the particular user, and $w_k$ is a corresponding user channel gain and $\sigma^2$ is an estimated noise variance. Various ways of estimating the user channel gain and noise variance will occur to one of skill in the art. Alternately, different scaling factors, or even omitting the scaling factor entirely, may prove useful depending upon the operating conditions.

The weighted symbol generator 110 can be implemented using a plurality of second multipliers 212 to multiply each estimated symbol $\hat{x}_k$ 128 by its corresponding weight $w_k$ 130. The multipliers 208, 212 can be implemented using an amplifier, digital multiplier, lookup tables, or other analog or digital equivalents.

The reconstructor 112 can be implemented by using a plurality of re-spreaders 214, which re-spread the weighted symbols 130 using the corresponding spreading codes 232 to produce a plurality of re-spread symbols 226. The re-spreaders can be implemented using analog or digital techniques as will occur to one of skill in the art. The re-spread symbols can then be summed in the third adder 216 to produce a summed signal 228. Optionally, the summed signal can be filtered by a channel filter, for example TX/RX filter 218 to provide the reconstructed signal 132, or the summed signal can be provided directly as the reconstructed signal. The TX/RX filter can, for example, correspond to filtering performed in the receiver 202, and in the transmitter or transmitters (not shown) which created the CDMA signal 120. In particular, where contribution to the multi-user interference is provided by mismatch between the filtering in the transmitters (not shown) and receiver 202, the TX/RX filter can reproduce the effects of the mismatch in the reconstructed signal. Consequently, better performance may be obtained by including the TX/RX filter. As will be apparent to one of skill in the art in possession of this disclosure, it is not essential that the TX/RX filter exactly model the filtering in the transmitters and receiver. Generally, however, the higher the fidelity of TX/RF filtering in modeling the transmitters and receiver, the better the performance of the apparatus 200.

As noted above, the use of a single reconstructed signal by the apparatus 200 is a significant simplification over prior art interference cancellers. In the prior art, multiple unique reconstructed signals are generated, one for each user using multiple summations. In contrast, the apparatus uses a single third adder to provide the reconstructed signal.

An apparatus for mitigating multi-user interference in reception of a CDMA signal (e.g. FIG. 1 or FIG. 2) can be implemented entirely in the digital domain. For example, the CDMA signal can be in the form of a downconverted, sampled, and digitized signal. The apparatus can be implemented partly or entirely in a field programmable gate array (FPGA) or application specific integrated circuit (ASIC). In another example, the apparatus can be implemented entirely by software executing on a general purpose processor or digital signal processor (DSP), where the equivalents of the components are provided by processing instructions of an executable program. In yet another example, the apparatus can be implemented using discrete analog or digital components. Various other implementation techniques will occur to one of skill in the art in possession of this disclosure.

Figure 3:
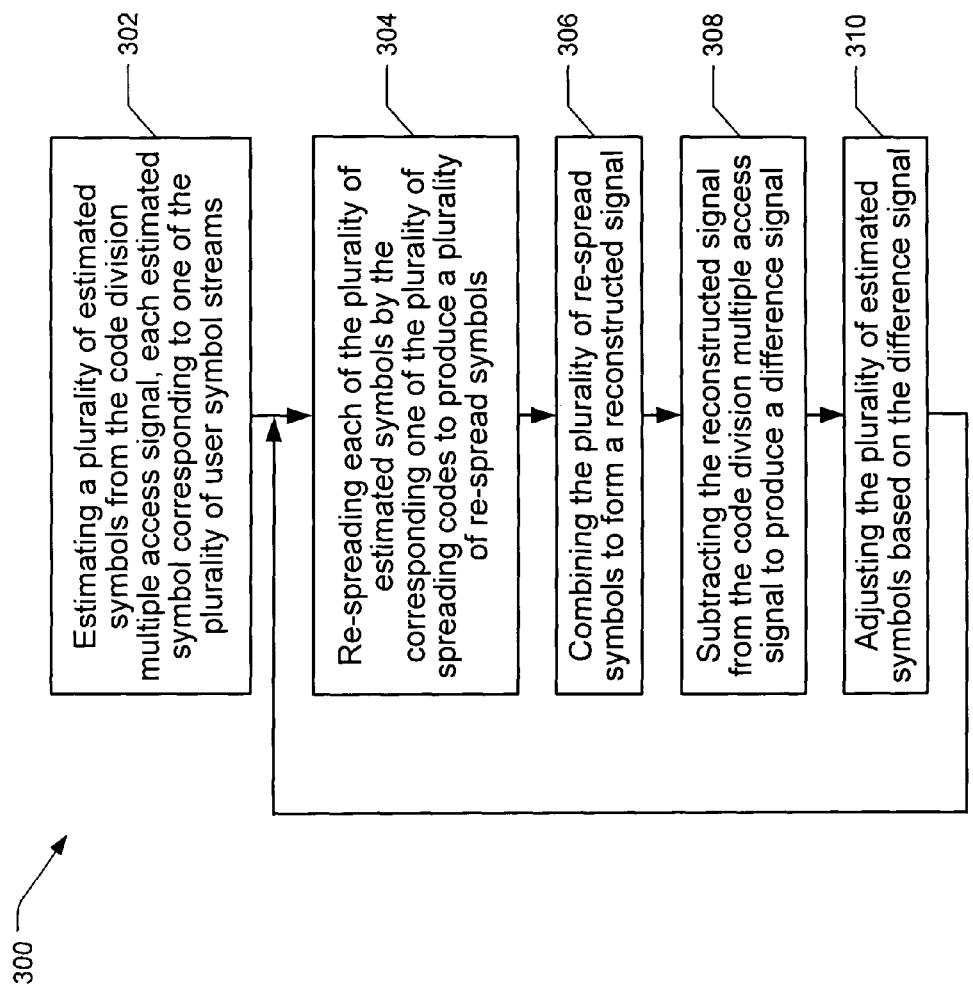
FIG. 3 is a flow chart of method for mitigating multi-user interference in CDMA reception in accordance with an embodiment of the present invention.

In accordance with another embodiment of the present invention, a flow chart of a method for mitigating multi-user interference in reception of a CDMA signal is illustrated in FIG. 3. The method, shown generally at 300, includes estimating 302 a plurality of estimated symbols from the CDMA signal, where each estimated symbol corresponds to one of the plurality of user symbol streams. The method also includes iteratively improving the plurality of estimated samples. Iteratively improving the plurality of estimated samples can include:

re-spreading 304 the plurality of estimated symbols by the corresponding spreading codes to produce a plurality of re-spread symbols, for example as described above;

combining 306 the plurality of re-spread symbols to form a reconstructed signal, for example by summing the plurality of re-spread symbols as described above;

subtracting 308 the reconstructed signal from the CDMA signal to produce a difference signal, for example as described above; and adjusting 310 the plurality of estimated symbols based on the difference signal, for example as described above.

In accordance with additional embodiments of the present invention, estimating the plurality of estimated symbols can include despreading the CDMA signal using a plurality of despreading codes corresponding to the plurality of spreading codes, for example as described above. Estimating the plurality of estimate symbols can include performing an error correction decoding operation, for example as described above. Re-spreading the plurality of estimated symbols can include filtering the plurality of re-spread symbols with a channel filter, for example a TX/RX filter as described above. Re-spreading the plurality of estimated symbols can also include converting from the symbol rate to the chip rate. Combining the plurality of re-spread symbols can include scaling each of the plurality of re-spread symbols by a corresponding weight and summing the plurality of re-spread signals to form the reconstructed signal, for example as described above.

In accordance with another embodiment, adjusting the plurality of estimated symbols can include despreading the difference signal to obtain a difference component corresponding to one of the plurality of user symbol streams, summing the difference component with a corresponding weighted symbol estimate to obtain an adjusted difference, and determining a new symbol estimate from the adjusted difference, for example as described above. Adjusting the plurality of estimated symbols can be performed for each user symbol stream at a different time, for example when the user symbol streams are asynchronous as described above.

Figure 4:
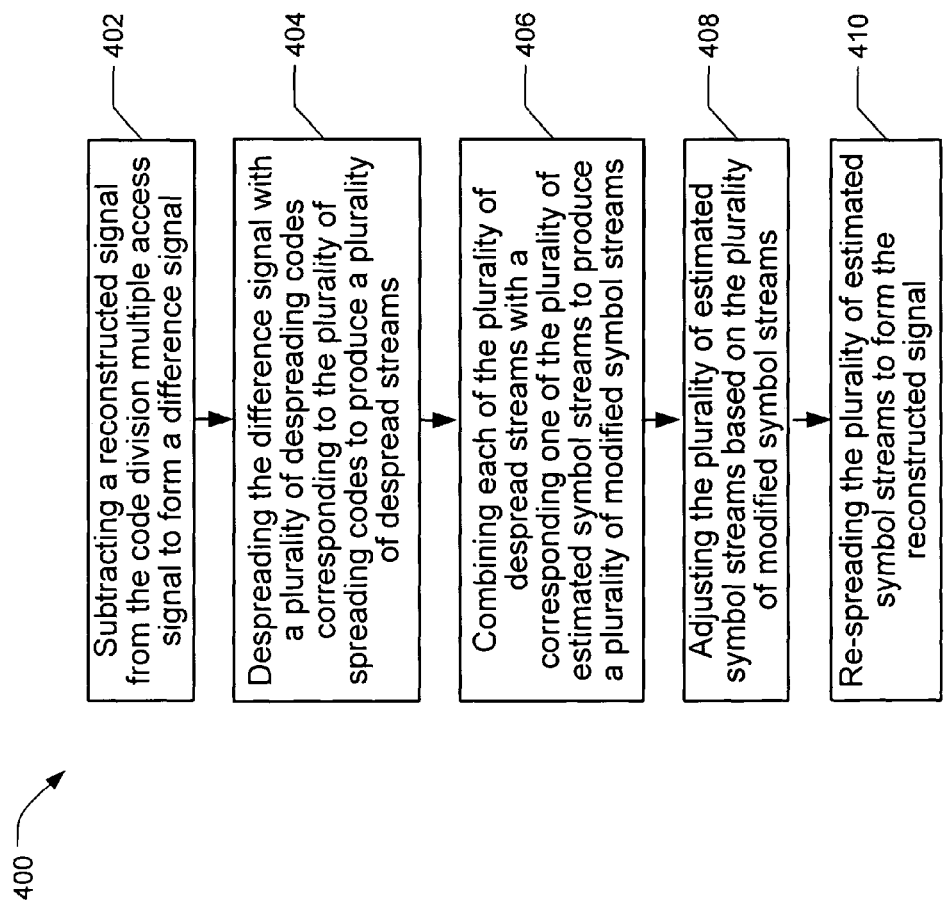
FIG. 4 is a flow chart of another method for mitigating multi-user interference in CDMA reception in accordance with an embodiment of the present invention.

Finally, a flow chart of a method for mitigating multi-user interference in reception of a CDMA signal is illustrated in FIG. 4 in accordance with another embodiment of the present invention. The method, shown generally at 400, can include subtracting 402 a reconstructed signal from the code division multiple access signal to form a difference signal, for example as described above. The method can further include despreading 404 the difference signal with a plurality of despreading codes corresponding to the plurality of spreading codes to produce a plurality of despread streams, for example as described above. The method can further include combining 406 each of the plurality of despread streams with a corresponding one of the plurality of estimated symbol streams to produce a plurality of modified symbol streams, for example as described above. The method can further include adjusting 408 the plurality of estimated symbol streams based on the plurality of modified symbol streams 408, for example as described above. Finally, the method can also include re-spreading 410 the plurality of estimated symbol streams to form the reconstructed signal, for example as described above.

In accordance with additional embodiments of the present invention, despreading the difference signal can include matched filtering the difference signal, for example as described above. Adjusting the plurality of estimated symbol streams can include performing a hyperbolic tangent or error correction decoding function, for example as described above. Re-spreading the plurality of estimated symbol streams can include filtering the reconstructed signal with a channel filter, for example as described above.

From the foregoing, it will be appreciated that several advantages are provided by the presently disclosed inventive techniques. Through the use of an iterative solution, difficult matrix inversions can be avoided. Additionally, limited knowledge of the channel statistics can be accommodated, since the cross-correlation statistics between users is generated automatically through by de-spreading and re-spreading. Furthermore, reduced processing relative to some prior art interference cancellers has been obtained by reducing the number of components which operate at this chip rate. Finally, operation for asynchronous users can be accommodated. Additional advantages may occur to one of skill in the art.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. An apparatus for mitigating multi-user interference in reception of a code division multiple access signal having a plurality of spread user symbol streams each spread by a corresponding one of a plurality of spreading codes comprising:

a first summer having an input configured to accept the code division multiple access signal and configured to subtract a reconstructed signal from the code division multiple access signal to produce a difference signal;

a plurality of matched filters coupled to the first summer and configured to accept the difference signal and output a plurality of matched filter outputs;

a plurality of second summers coupled to the plurality of matched filters and configured to sum each one of the plurality of matched filter outputs with a corresponding one of a plurality of weighted symbol estimates to produce a plurality of adjusted matched filter outputs;

a plurality of estimators coupled to the plurality of second summers and configured to estimate a plurality of estimated symbols from the plurality of adjusted matched filter outputs, wherein each one of the plurality of estimated symbols corresponds to one of the plurality of spread user symbol streams;

a weighted symbol generator coupled to the plurality of estimators and coupled to the plurality of second summers and configured to generate the plurality of weighted symbol estimates from the plurality of estimated symbols; and a reconstructor coupled to the weighted symbol generator and coupled to the first summer and configured to re-spread the plurality of weighted symbol estimates using the plurality of spreading codes to produce the reconstructed signal.

2. The apparatus of claim 1 further comprising a receiver coupled to the first summer and configured to accept the code division multiple access signal at a radio frequency and down-convert the code division multiple access signal to an intermediate frequency and output the code division multiple access signal to the first summer.

3. The apparatus of claim 1 wherein the plurality of matched filters further comprises a plurality of despreaders, each despreader having a despreading code corresponding to one of the plurality of spreading codes.

4. The apparatus of claim 1 wherein the estimator further comprises a scaling circuit configured to scale the adjusted matched filter output by a scaling factor chosen from the group consisting of $(w_k)^{-1}$ and $w_k(w_k+\sigma^2)^{-1}$ wherein $w_k$ is an estimated channel gain corresponding to spread user symbol stream k and $\sigma^2$ is an estimated noise variance.

5. The apparatus of claim 1 wherein the estimator is further configured to take the hyperbolic tangent of the adjusted matched filter output.

6. The apparatus of claim 1 wherein the estimator further comprises an error correction decoder.

7. The apparatus of claim 6 wherein the error correction decoder is selected from the group consisting of a convolutional decoder, a block decoder, and a turbo decoder.

8. The apparatus of claim 1 wherein each of the weighted symbol generators further comprises a multiplier configured to multiply each of the estimated symbols by a corresponding weighting factor based on an estimated channel gain of the corresponding one of the plurality of spread user symbol streams.

9. The apparatus of claim 1 wherein the reconstructor further comprises:
   a plurality of spreaders coupled to the weighted symbol generator, each spreader configured to spread a corresponding one of the weighted symbols by a corresponding one of the plurality of spreading codes to produce a spread symbol; and
   a summer coupled to the plurality of spreaders and configured to sum the spread symbols to produce the reconstructed signal.

10. The apparatus of claim 1 wherein the reconstructor further comprises a channel filter configured to filter the reconstructed signal.

11. The apparatus of claim 1 wherein
   the first summer, the plurality of matched filters, and the reconstructor operate at substantially a chip rate of the code division multiple access signal; and
   the plurality of second summers, the plurality of estimators, and the weighted symbol generator operate at substantially a symbol rate of the code division multiple access signal.

12. The apparatus of claim 1 wherein the plurality of spread user symbol streams operate asynchronously with respect to each other.

* * * * *